(12) United States Patent
Kanagawa et al.

(10) Patent No.: US 8,277,930 B2
(45) Date of Patent: *Oct. 2, 2012

(54) MOISTURE-PERMEABLE FILM, PRODUCTION METHOD OF SAME AND LAMINATE USING SAME

(75) Inventors: Yoshinori Kanagawa, Osaka (JP); Minoru Takahashi, Osaka (JP)

(73) Assignee: DIC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/676,179

(22) PCT Filed: Dec. 1, 2008

(86) PCT No.: PCT/JP2008/071770
§ 371 (c)(1),
(2), (4) Date: Mar. 3, 2010

(87) PCT Pub. No.: WO2009/107301
PCT Pub. Date: Sep. 3, 2009

(65) Prior Publication Data
US 2011/0287242 A1      Nov. 24, 2011

(30) Foreign Application Priority Data
Feb. 27, 2008    (JP) ................................. 2008-045902

(51) Int. Cl.
C08F 8/30 (2006.01)
C08F 283/04 (2006.01)
C08G 18/10 (2006.01)
C08G 18/67 (2006.01)
C08G 18/00 (2006.01)
C03C 25/10 (2006.01)
C08L 75/00 (2006.01)

(52) U.S. Cl. .............. 428/220; 528/59; 528/75; 522/96; 522/97; 522/174; 525/127; 525/440.07; 525/440.09; 525/455

(58) Field of Classification Search .................... None
See application file for complete search history.

(56) References Cited

U.S. PATENT DOCUMENTS

| | | | | |
|---|---|---|---|---|
| 4,855,334 A | * | 8/1989 | Maruyama et al. | ............. 522/96 |
| 7,914,896 B2 | * | 3/2011 | Kanagawa et al. | ........ 428/423.1 |
| 2010/0068499 A1 | * | 3/2010 | Kanagawa et al. | ........ 428/318.6 |

FOREIGN PATENT DOCUMENTS

| | | | |
|---|---|---|---|
| EP | 0522250 A1 | | 1/1993 |
| JP | 11-189762 A | | 7/1999 |
| JP | 2002-327310 A | | 11/2002 |
| JP | 2003-335873 A | | 11/2003 |
| JP | 2006-188589 A | | 7/2006 |
| JP | 2007-063510 | * | 3/2007 |
| JP | 2007-063510 A | | 3/2007 |
| WO | WO 2008/065920 | * | 6/2008 |
| WO | WO-2009/011177 A1 | | 1/2009 |

OTHER PUBLICATIONS

Supplementary European Search Report dated Jan. 17, 2011, issue for the corresponding European Patent Application No. 08872926.4.
International Search Report dated Feb. 24, 2009, issued on PCT/JP2008/071770.

* cited by examiner

*Primary Examiner* — David Sample
*Assistant Examiner* — Nicole Gugliotta
(74) *Attorney, Agent, or Firm* — Edwards Wildman Palmer LLP; James E. Armstrong, IV; Nicholas J. DiCeglie, Jr.

(57) ABSTRACT

An object of the present invention is to provide a moisture-permeable film having superior moisture permeability and flexibility at levels enabling the use thereof in the production of textile products such as clothes, while also not being susceptible to the occurrence of decreases in surface quality caused by roughening. The present invention relates to a moisture-permeable film obtained by curing a reactive polyurethane hot melt resin composition comprising a reactive urethane prepolymer (D), a (meth)acrylate (E) and a photopolymerization initiator (F), wherein the reactive urethane prepolymer (D) is obtained by reacting a hydroxyl group-containing (meth)acrylate (C) with 10% to 90% of the equivalent of isocyanate groups possessed by an urethane prepolymer obtained by reacting a polyisocyanate (B) with a polyol (A); and the polyol (A) contains a polyester polyol (a-1) which is obtained by reacting polycarboxylic acid with a polyol in which an alkylene oxide is added to bisphenol A, a polyester polyol (a-2) which is a solid at normal temperature and a polyethylene glycol (a-3) which has a number average molecular weight of 1000 to 25,000.

8 Claims, No Drawings

MOISTURE-PERMEABLE FILM, PRODUCTION METHOD OF SAME AND LAMINATE USING SAME

TECHNICAL FIELD

The present invention relates to a film able to be used in the production of moisture-permeable, waterproof clothes such as sportswear, and a moisture-permeable film able to be used in a bandage film, disposable diaper film or moisture-regulating construction material film used in wall materials, roofs and the like.

BACKGROUND ART

Sportswear such as mountain climbing wear is generally required to have mobility or lightness upon wearing, as well as excellent moisture permeability, waterproofing property and the like. Moisture permeability is an important property for suppressing the unpleasant feeling due to, for example, the sultriness caused by moisture generated from the body, such as sweat, staying within the clothes.

The moisture permeability of clothes as described above is known to be able to be improved by using a moisture-permeable film as one of the materials used to produce clothes. A known example of such moisture-permeable films is a porous moisture-permeable film (see, for example, Patent Document 1).

However, there are many cases in which such moisture-permeable films are produced by coating a resin composition dissolved or dispersed in a solvent such as an organic solvent or water on a releasable film followed by removing the solvent, and in the case of such methods, there have been problems such as an increased burden on the environment attributable to volatilization of the organic solvent, and increased energy consumption as a result of having to remove the solvent.

The aforementioned problem attributable to the solvent is known to be able to be solved by using a hot melt resin composition that is substantially free of solvent, and a known example of such a hot melt resin composition is a moisture-curable polyurethane hot melt composition (see, for example, Patent Document 2).

However, films obtained by using conventionally known moisture-curable polyurethane hot melt resin compositions did not have a level of moisture permeability adequate for practical use, while also not satisfying requirements relating to flexibility (pliable texture) or mechanical strength that permitted use in the production of clothes and the like. In addition, since these films swelled when contacted with water and the like causing a considerable decrease in film strength, there were cases in which it was typically difficult to use such films in materials such as clothes that was subjected to laundering and the like.

In this manner, conventional moisture-curable polyurethane hot melt resin compositions presented difficulties in obtaining moisture-permeable films that provided adequate levels of moisture permeability, flexibility and mechanical strength for practical use while also demonstrating superior waterproofing property.

However, when producing a moisture-permeable film using a moisture-curable polyurethane hot melt resin composition as described above, there are many cases in which it is necessary to wind the moisture-curable polyurethane hot melt resin composition onto roller while coated onto a releasable film in a heated molten state, and then allowing curing to proceed adequately by allowing to stand for a fixed period of time.

However, since there are many cases in which winding onto a roller as described above is carried out before the moisture-curable polyurethane hot melt resin composition has completely cured, in cases in which separation of the moisture-permeable film composed of the moisture-curable polyurethane hot melt resin composition from the back of the releasable film in contact therewith is poor when the composition is unwound, roughening occurs on the surface of the moisture-permeable film during separation, thereby resulting in the problem of a decrease in the surface quality thereof.

As has been described above, there has yet to be disclosed a moisture-permeable film which has superior moisture permeability, flexibility (pliable texture), mechanical strength and waterproofing property at levels enabling the use thereof in the production of textile products such as clothes, which is not susceptible to the occurrence of a decrease in surface quality caused by roughening, and which does not cause an increase in the burden on the environment.

Patent Document 1: Japanese Unexamined Patent Application, First Publication No. 2002-327310

Patent Document 2: Japanese Unexamined Patent Application, First Publication No. 2007-63510

DISCLOSURE OF THE INVENTION

Problems to be Solved by the Invention

An object of the present invention is to provide a moisture-permeable film having superior moisture permeability, flexibility (pliable texture), mechanical strength and waterproofing property at levels enabling the use thereof in the production of textile products such as clothes, while also not being susceptible to the occurrence of decreases in surface quality caused by roughening.

In addition, the present invention provides a production method of a moisture-permeable film which has superior moisture permeability, flexibility (pliable texture), mechanical strength and waterproofing property as described above, which is not susceptible to the occurrence of decreases in surface quality caused by roughening, and which does not cause an increase in the burden on the environment.

In addition, the present invention provides a laminate which has superior moisture permeability, flexibility (pliable texture), mechanical strength and waterproofing property as described above, which is not susceptible to the occurrence of decreases in surface quality caused by roughening, and which does not cause an increase in the burden on the environment.

Means for Solving the Problems

The inventors of the present invention conducted studies on imparting superior moisture permeability to a moisture-permeable film obtained using a reactive polyurethane hot melt resin composition by using a hydrophilic material such as polyoxyethylene glycol as a polyol component that composes a urethane prepolymer contained in the resin composition. More specifically, the inventors of the present invention coated a molten hot melt resin composition composed of an isocyanate group-containing urethane prepolymer, obtained by reacting polyoxyethylene glycol and polyisocyanate, onto a releasable film, wound the resulting film onto a roller, and allowed the wound film to stand for a fixed period of time to produce a moisture-permeable film, followed by evaluating the property thereof.

As a result, although the resulting moisture-permeable film demonstrated extremely superior moisture permeability of a level comparable to that of conventional products, it did not have a flexible pliable texture, mechanical strength or waterproofing property of levels that permitted it to be used in the production of clothes and the like.

In addition, roughening occurred on the surface of the moisture-permeable film produced according to the aforementioned method, and was not considered to have a level of surface quality adequate for practical use.

During the course of proceeding with further studies to improve the flexible pliable texture, mechanical strength, waterproofing property and surface quality of the film while maintaining superior moisture permeability, the inventors of the present invention thought that decreases in surface quality of the moisture-permeable film in particular could be improved to a certain degree if it were possible to allow curing of the moisture-permeable film to proceed rapidly, and conducted studies on the combined use of a photocuring reaction with a conventional moisture curing reaction attributable to isocyanate groups.

More specifically, when studies were conducted on a moisture-permeable film obtained by forming a reactive polyurethane hot melt resin composition, which contained 10 to 90% of the equivalent of isocyanate groups possessed by a prepolymer obtained by reacting various polyols and polyisocyanate, a reactive urethane prepolymer obtained by reacting a hydroxyl group-containing (meth)acrylate and a photopolymerization initiator, into a film, and carrying out a moisture curing reaction attributable to the isocyanate groups and a photoradical polymerization reaction attributable to polymerizable unsaturated double bonds, roughening on the surface of the moisture-permeable film was comparatively inhibited.

However, since the appearance of textile products requires an extremely high level of surface quality, the surface quality of the moisture-permeable film was still slightly below that of the level required by the textile industry. In addition, the moisture-permeable film was still considered to be inadequate in terms of flexibility, mechanical strength and waterproofing property.

During the course of subsequently conducting studies to further improve surface quality, the inventors of the present invention also conducted studies on combining the use of (meth)acrylate with the reactive polyurethane hot melt resin composition composing the aforementioned moisture-permeable film, and found that a moisture-permeable film obtained using such a method allowed the obtaining of significantly superior surface quality in comparison with conventional products.

However, even in the case of this moisture-permeable film, since it still failed to demonstrate levels of flexibility, mechanical strength and waterproofing property adequate for practical use, it was necessary to make further improvements in order to solve the problems to be solved by the invention.

The inventors of the present invention therefore further attempted to improve the flexible pliable texture, mechanical strength and so forth of the resulting moisture-permeable film described above by examining various combinations of polyols that compose the urethane prepolymer in the moisture-permeable film.

More specifically, the inventors of the present invention examined the use of a urethane prepolymer, which has polyoxyethylene glycol as an essential component thereof for the purpose of imparting superior moisture permeability, and which is obtained by reacting isocyanate with a polyol that combines a long-chain aliphatic polyester polyol obtained by reacting, for example, 1,6-hexanediol and 1,12-dodecanedioic acid, for the purpose of further imparting flexibility and mechanical strength, and a crystalline polyester polyol that is a solid at normal temperatures, such as a polyester polyol having a branched structure obtained by reacting neopentyl glycol and adipic acid.

However, the moisture-permeable film obtained by combining the use of the aforementioned polyols did not have adequate flexibility and mechanical strength for practical use.

The inventors of the present invention then guess that both superior flexibility and mechanical strength could be realized by improving the compatibility of the aforementioned polyoxyethylene glycol and the aforementioned polyester polyols, and conducted studies to enhance the compatibility of these polyol components. More specifically, studies were conducted on the combined use of the aforementioned polyols with a polyester polyol obtained by reacting a polyol, in which an alkylene oxide was added to bisphenol A, with polycarboxylic acid.

As a result, it was found that a moisture-permeable film, which is obtained by curing a reactive polyurethane hot melt resin composition comprising a reactive urethane prepolymer (D), a (meth)acrylate (E) and a photopolymerization initiator (F), wherein the reactive urethane prepolymer (D) is obtained by reacting a hydroxyl group-containing (meth)acrylate (C) with 10% to 90% of the equivalent of isocyanate groups possessed by an urethane prepolymer obtained by reacting a polyisocyanate (B) with a polyol (A); and the polyol (A) is obtained by combining a polyethylene glycol which has a number average molecular weight of 1000 to 25,000, a polyester polyol which is a solid at normal temperature and a polyester polyol which is obtained by reacting polycarboxylic acid with a polyol in which an alkylene oxide is added to bisphenol A, is able to achieve all of the objects of the present invention.

Thus, the moisture-permeable film of the present invention is an industrially useful invention that is able to realize both superior moisture permeability as well as a superior flexible pliable texture, mechanical strength and waterproofing property.

Namely, the present invention relates to a moisture-permeable film obtained by reacting a polyisocyanate (B) with a polyol (A), comprising a polyester polyol (a-1), which is obtained by reacting polycarboxylic acid with a polyol in which an alkylene oxide is added to bisphenol A, a polyester polyol (a-2), which is a solid at normal temperature, and polyethylene glycol (a-3), which has a number average molecular weight of 1000 to 25,000, to obtain a urethane prepolymer, reacting 10 to 90% of the equivalent of isocyanate groups possessed by the resulting urethane prepolymer with a hydroxyl group-containing (meth)acrylate (C) to obtain a reactive urethane prepolymer (D), and curing a reactive polyurethane hot melt resin composition comprising the resulting reactive urethane prepolymer (D), a (meth)acrylate (E) and a photopolymerization initiator (F), and to a production method thereof.

Effects of the Invention

Since the moisture-permeable film of the present invention has superior moisture permeability, flexibility (pliable texture), mechanical strength and waterproofing property, it has high utility value in terms of being able to be used in textile products such as clothes, and more specifically in sportswear, raincoats, gloves, shoes, fire fighting clothes, military uniforms, bandage films, disposable diapers or moisture-regulating construction material film used in wall materials, roofs and the like.

BEST MODE FOR CARRYING OUT THE INVENTION

The moisture-permeable film of the present invention is obtained by reacting a polyisocyanate (B) with a polyol (A), comprising a polyester polyol (a-1), which is obtained by reacting polycarboxylic acid with a polyol in which an alkylene oxide is added to bisphenol A, a polyester polyol (a-2), which is a solid at normal temperature, and polyethylene glycol (a-3), which has a number average molecular weight of 1000 to 25,000, to obtain a urethane prepolymer, reacting 10 to 90% of the equivalent of isocyanate groups possessed by the resulting urethane prepolymer with a hydroxyl group-containing (meth)acrylate (C) to obtain a reactive urethane prepolymer (D), and curing a reactive polyurethane hot melt resin composition comprising the resulting reactive urethane prepolymer (D), a (meth)acrylate (E) and a photopolymerization initiator (F).

Since the moisture-permeable film of the present invention consists of forming a reactive polyurethane hot melt resin composition, which is substantially free of a solvent such as organic solvent or water, into a film as previously described, a step for volatilizing the solvent is not required in the production thereof.

Although varying according to the application in which it is used and the like, the moisture-permeable film preferably has a film thickness generally within the range of 5 to 50 µm. The film thickness is preferably within the range of 5 to 30 µm in cases requiring an even higher level of moisture permeability.

Although the moisture-permeable film of the present invention may be non-porous or porous, a non-porous moisture-permeable film is preferable from the viewpoint of realizing both superior moisture permeability and superior waterproofing property of a level that is capable of preventing entrance of rainwater, for example.

An explanation is first provided of the reactive urethane prepolymer (D) used in the present invention.

The reactive urethane prepolymer (D) is obtained by reacting 10 to 90% of the equivalent of isocyanate groups possessed by an isocyanate group-containing urethane prepolymer with a hydroxyl group-containing (meth)acrylate (C), and a preferable aspect thereof consists of, for example, (i) a mixture of a urethane prepolymer (D1) having isocyanate groups on both terminals of a molecule thereof and a urethane prepolymer (D2) having polymerizable unsaturated double bonds on both terminals of a molecule thereof, or (ii) a urethane prepolymer (D3) alone, in which one of the molecular terminals thereof has an isocyanate group while the other terminal has the aforementioned polymerizable unsaturated double bond, or a mixture thereof with the urethane prepolymer (D1) or (D2).

The use of such a reactive urethane prepolymer (D) enables a moisture curing reaction attributable to isocyanate groups and a photoradical polymerization reaction attributable to polymerizable unsaturated double bonds to proceed rapidly, thereby making it possible to significantly improve the curing rate of the reactive polyurethane hot melt resin composition. As a result, tackiness of the moisture-permeable film surface is reduced and the occurrence of roughening is inhibited, thereby making it possible to obtain a moisture-permeable film having superior surface quality.

Isocyanate groups of the aforementioned reactive urethane prepolymer (D) impart "moisture curing" property to the reactive urethane prepolymer (D). More specifically, the isocyanate groups react with moisture (namely, water) in the air to contribute to the formation of a crosslinked structure. Consequently, when the molten reactive polyurethane hot melt resin composition is coated on the surface of a releasable film and the like, the reactive urethane prepolymer (D) forms a crosslinked structure by reacting with moisture contained in the air, thereby forming a moisture-permeable film having superior waterproofing property.

The aforementioned isocyanate groups are preferably present within the range of 1.0 to 5.0% by weight, and more preferably within the range of 1.5 to 3.0% by weight, of the entire reactive urethane prepolymer (D). The use of a prepolymer (D) having isocyanate groups within these ranges makes it possible to control the melt viscosity of the reactive polyurethane hot melt resin composition at 125° C. to 10000 mPa·s or less, thereby making it possible to improve coatability of the composition as well as improve the mechanical strength of the resulting moisture-permeable film.

In addition, polymerizable unsaturated double bonds derived from the aforementioned hydroxyl group-containing (meth)acrylate (C) impart "photocuring" property to the reactive urethane prepolymer (D). The photocuring property refer to property that result in curing by a radical polymerization reaction of the polymerizable unsaturated double bonds brought about by radicals generated by irradiation with ultraviolet light and the like.

Although the amount of the polymerizable unsaturated double bonds present depends on the amount of the subsequently described hydroxy group-containing (meth)acrylate (C) used, preferably 10 to 90% of the equivalent of the isocyanate groups are reacted with the hydroxyl group-containing (meth)acrylate (C) in terms of rapidly dissipating surface tack following irradiation with ultraviolet light and obtaining a film provided with superior mechanical strength.

In addition, the aforementioned reactive urethane prepolymer (D) has "hot melt" property. Hot melt property refer to property attributable to the molecular structure of the selected prepolymer, and although they refer to a state of high consistency to a degree that makes application to a solid or base material at normal temperatures difficult, enables coating onto a base material to be carried out as a result of melting by heating, while also demonstrating adhesion following solidification by cooling. In the present invention, the term "hot melt" is used to generally refer to the property described above as well as a substance having such property.

The aforementioned hot melt property are intimately related to softening point, and the workability of a typically used urethane prepolymer becomes easier the lower the softening point thereof, while conversely adhesive strength tends to become favorable the higher the softening point.

The softening point of the reactive urethane prepolymer (D) used in the present invention is preferably within the range of 40 to 120° C. If the softening point of the urethane prepolymer is within this range, the fluidity and processability of the molten reactive polyurethane hot melt resin composition can be enhanced, and the production efficiency of the moisture-permeable film of the present invention can be improved. Furthermore, softening point as referred to in the present invention refers to the temperature at which convective flow begins and cohesive force is lost when the temperature of the urethane prepolymer is raised in a stepwise manner, and more specifically, refers to the value as determined in accordance with the ring and ball method (JIS K-6301).

In addition, the glass transition temperature (Tg) of a cured product obtained by coating the reactive urethane prepolymer (D) onto a base material to a thickness of 30 µm, and aging for 5 days in an atmosphere at an environmental temperature of 23° C. and relative humidity of 65% is preferably within the range of −50 to 40° C. and more preferably within the range of −40 to 30° C. The use of a reactive urethane prepolymer capable of forming a cured product having a glass transition temperature within the aforementioned ranges allows the formation of a film having superior waterproofing property and mechanical strength as well as flexible pliable texture even in low-temperature environment. Furthermore, the aforementioned glass transition temperature refers to a value measured in the form of the peak temperature of loss tangent (tan δ) obtained by measuring at a frequency of 1 Hz and heating rate of 5° C./min with a dynamic viscoelasticity measuring system (Rheometric Scientific) (unit: ° C.).

Although substances typically referred to as urethane prepolymers in the manner of the aforementioned reactive urethane prepolymer (D) frequently have a comparatively low molecular weight, among persons with ordinary skill in the art, those having a number average molecular weight (Mn) of several tens of thousands are generally referred to as urethane prepolymers, and a urethane prepolymer (D) having a number average molecular weight of several ten thousands can be used in the present invention. More specifically, the number average molecular weight thereof is preferably within the range of 500 to 30000 and more preferably within the range of 1000 to 10000. If the number average molecular weight of the urethane prepolymer (D) is within these ranges, the fluidity and processability of the molten reactive polyurethane hot melt resin composition can be enhanced, and the production efficiency of the moisture-permeable film of the present invention can be improved.

In addition, the melt viscosity of the reactive urethane prepolymer (D) at 125° C. is preferably within the range of 500 to 9000 mPa·s.

The reactive urethane prepolymer (D) can be produced by, for example, a first step, in which an isocyanate group-containing urethane prepolymer is produced by reacting a polyisocyanate (B) with a polyol (A) containing a polyester polyol (a-1), obtained by reacting polycarboxylic acid with a polyol in which an alkylene oxide is added to bisphenol A, a polyester polyol (a-2), which is a solid at normal temperatures, and polyoxyethylene glycol (a-3), which has a number average molecular weight of 1000 to 25000; and, a second step in which 10 to 90% of the equivalent of isocyanate groups possessed by the isocyanate group-containing urethane prepolymer are reacted with a hydroxyl group-containing (meth) acrylate (C).

An explanation is first provided of the first step described above.

The aforementioned first step is a step in which the polyol (A) and the polyisocyanate (B) are reacted under conditions such that isocyanate groups possessed by the polyisocyanate (B) are in excess with respect to hydroxyl groups possessed by the polyol (A).

It is important in terms of achieving an object of the present invention that a combination consisting of main components in the form of a polyester polyol (a-1), obtained by reacting polycarboxylic acid with a polyol in which an alkylene oxide is added to bisphenol A, a polyester polyol (a-2), which is a solid at normal temperatures, and polyoxyethylene glycol (a-3), which has a number average molecular weight of 1000 to 25000, be used for the polyol (A). Use of this combination of components allows the obtaining of a moisture-permeable film having adequate levels of moisture permeability, flexibility and mechanical strength for practical use.

An explanation is first provided of the polyester polyol (a-1).

The aforementioned polyester polyol (a-1) is obtained by a condensation reaction of polycarboxylic acid with a polyether polyol in which an alkylene oxide is added to bisphenol A.

The polyester polyol (a-1) makes the polyester polyol (a-2), which is a solid at normal temperatures compatible with the polyoxyethylene glycol (a-3). As a result, the mechanical strength and flexibility of the resulting moisture-permeable film can be improved.

A polyester polyol obtained by reacting polycarboxylic acid with a polyether polyol in which an alkylene oxide is added to bisphenol A can be used for the polyester polyol (a-1), and that having a high consistency at normal temperatures is used preferably.

The polyether polyol in which an alkylene oxide is added to bisphenol A can be produced by, for example, adding alkylene oxide by a commonly known method using bisphenol A as an initiator.

Examples of alkylene oxides that can be used include ethylene oxide and propylene oxide, and propylene oxide is used particularly preferably since it imparts a flexible pliable texture.

The alkylene oxide is preferably added to the bisphenol A at 1 to 10 moles and more preferably at 2 to 8 moles. The use of a polyether polyol in which alkylene oxide is added to bisphenol A within the aforementioned ranges further improves the compatibility among the polyester polyol (a-2) and the polyoxyethylene glycol (a-3), and as a result, a moisture-permeable film can be obtained that has adequate levels of mechanical strength and flexible pliable texture for practical use.

In addition, a polycarboxylic acid such as an aliphatic dicarboxylic acid, aromatic dicarboxylic acid or alicyclic dicarboxylic acid can be suitably selected and used to react with the polyether polyol in which the alkylene oxide is added to bisphenol A.

Examples of the aforementioned aliphatic dicarboxylic acid that can be used include succinic acid, maleic acid, adipic acid, glutaric acid, pimelic acid, suberic acid, azelaic acid, sebacic acid and dodecanedicarboxylic acid, and sebacic acid is used more preferably to inhibit roughening of the resulting film.

In addition, examples of the aromatic dicarboxylic acid that are used preferably include phthalic acid, isophthalic acid and terephthalic acid. In addition, examples of the alicyclic dicarboxylic acid that can be used include hexahydroisophthalic acid.

In particular, the use of a polyester polyol (a-1) obtained by a condensation reaction of a polyether polyol, in which 4 to 8 moles of propylene oxide are added to bisphenol A, with the aliphatic dicarboxylic acid and the aromatic dicarboxylic acid further improves compatibility with the polyester polyol (a-2) and the polyoxyethylene glycol (a-3), and allows the obtaining of a moisture-permeable film having adequate levels of mechanical strength and flexible pliable texture for practical use, thereby making this preferable. At that time, the use of a combination of sebacic acid for the aliphatic dicarboxylic acid and isophthalic acid for the aromatic dicarboxylic acid is particularly preferable.

A polyester polyol having a number average molecular weight preferably within the range of 500 to 10000, and particularly preferably within the range of 1000 to 7000, is used for the polyester polyol (a-1). The use of a polyester polyol (a-1) having a number average molecular weight within the aforementioned ranges is preferable in terms of improving workability and improving production efficiency of the moisture-permeable film since the viscosity in the molten stage of the resulting reactive polyurethane hot melt resin composition can be held to a comparatively low level. In addition, this is also preferable in terms of further improving compatibility with the polyester polyol (a-2) and the polyoxyethylene glycol (a-3).

In addition, a polyester polyol having a glass transition temperature within the range of −50 to 40° C. is used preferably for the polyester polyol (a-1) since it results in favorable flexibility of the resulting moisture-permeable film, and since it enables flexibility to maintained at low temperatures in particular. This glass transition temperature can be adjusted by suitably altering the composition of the polyester polyol (a-1), and for example, the glass transition temperature can be adjusted to be within the above-mentioned range by adjusting the amount of the alkylene oxide added to the bisphenol A. Furthermore, the glass transition temperature of the polyol as referred to here refers to the peak endothermic temperature as measured using a differential scanning calorimeter (DSC) at a heating rate of 5° C./min starting at −80° C. in a nitrogen atmosphere. In addition, the polyester polyol (a-1) preferably does not demonstrate crystallinity.

The polyester polyol (a-1) is preferably used at 5 to 30 parts by weight, and more preferably 5 to 15 parts by weight, based on a value of 100 parts by weight for the total amount of the polyol (A) that composes the reactive urethane prepolymer (D). As a result, compatibility with the polyester polyol (a-2) and the polyoxyethylene glycol (a-3) is further improved, and as a result, a moisture-permeable film can be obtained that has adequate levels of mechanical strength and flexible pliable texture for practical use, thereby making this preferable.

Next, an explanation is provided of the polyester polyol (a-2) that is a solid at normal temperatures.

The polyester polyol (a-2) used when producing the reactive polyurethane prepolymer (D) is a polyester polyol that demonstrates crystallinity and is obtained by a condensation reaction between a low molecular weight polyol and polycarboxylic acid.

Here, crystallinity as referred to in the present invention refers to that for which the peak heat of fusion has been able to be confirmed when measuring using a differential scanning calorimeter (DSC).

Examples of the low molecular weight polyol that can be used include ethylene glycol, 1,4-butanediol, neopentyl glycol, 1,6-hexanediol, 1,8-octanediol and 1,10-decanediol, and the use of neopentyl glycol is particularly preferable in terms of imparting a flexible pliable texture to the moisture-permeable film of the present invention.

Examples of the polycarboxylic acid include succinic acid, adipic acid, suberic acid, azelaic acid, sebacic acid, dodecamethylene dicarboxylic acid, phthalic acid, isophthalic acid, terephthalic acid, hexahydroisophthalic acid and phthalic anhydride.

The use of a polyester polyol, in which neopentyl glycol and 1,6-hexanediol are combined for use as the low molecular weight polyol and adipic acid is used for the polycarboxylic acid, for the polyester polyol (a-2) is preferable in terms of reducing surface tackiness attributable to suitable solidification and imparting a flexible pliable texture.

The polyester polyol (a-2) preferably has a number average molecular weight of 10000 or less, and more preferably that within the range of 2000 to 5000.

The polyester polyol (a-2) is preferably used at 10 to 30 parts by weight, and more preferably at 5 to 15 parts by weight, based on a value of 100 parts by weight for the total amount of the polyol (A) that composes the reactive urethane prepolymer (D). As a result, a moisture-permeable film can be obtained that has adequate levels of mechanical strength and flexible pliable texture for practical use, thereby making this preferable.

The following provides an explanation of the polyoxyethylene glycol (a-3) used in the production of the urethane prepolymer.

The aforementioned polyoxyethylene glycol (a-3) is required in terms of imparting superior moisture permeability to the moisture-permeable film of the present invention.

Although the polyoxyethylene glycol (a-3) preferably has a number average molecular weight within the range of 1000 to 25000, the use of that having a number average molecular weight within the range of 2000 to 5500 is more preferable. The use of polyoxyethylene glycol (a-3) having a number average molecular weight within these ranges in combination with the aforementioned polyester polyol (a-1) and polyester polyol (a-2) allows the obtaining of a moisture-permeable film having adequate levels of mechanical strength and flexible pliable texture for practical use.

Examples of the polyoxyethylene glycol (a-3) include those obtained by ring-opening polymerization using ethylene oxide alone or the combined use of ethylene oxide and propylene oxide while using a low molecular weight polyol as an initiator.

Examples of low molecular weight polyols that can be used as initiators when producing the polyoxyethylene glycol (a-3) include ethylene glycol, 1,2-propylene glycol, 1,3-propylene glycol, 1,3-butylene glycol, 1,4-butylene glycol, 2,2-dimethyl-1,3-propanediol, 1,6-hexanediol, 3-methyl-1,5-pentanediol, 1,8-octanediol, diethylene glycol, triethylene glycol, dipropylene glycol and tripropylene glycol.

In addition, polyoxyethylene glycol in which γ-butyrolactone or ε-caprolactone and the like has been incorporated into a portion thereof by ring-opening addition may also be used for the polyoxyethylene glycol within a range that does not impair the effects of the present invention, and that in which propylene oxide and the like has been added in addition to the aforementioned ethylene oxide may also be used.

The polyoxyethylene glycol (a-3) is preferably used at 30 to 85 parts by weight, and more preferably at 30 to 70 parts by weight, based on a value of 100 parts by weight for the total amount of the polyol (A). As a result, a moisture-permeable film can be obtained that has an adequate level of moisture permeability for practical use.

Moreover, in addition to the various types of polyols previously listed, other polyols can be used in combination therewith for the polyol (A) used when producing the reactive urethane prepolymer (D) composing the present invention, within a range that does not hinder an object of the present invention.

Examples of other polyols that can be used include polyester polyols and polyether polyols other than those previously listed, acrylic polyols, polycarbonate polyols, polyolefin polyols and caster oil-based polyols.

Next, an explanation is provided of the polyisocyanate (B) used when producing the reactive urethane prepolymer (D).

Examples of the polyisocyanate (B) that can be used include aromatic polyisocyanates such as 4,4'-diphenylmethane diisocyanate, 2,4'-diphenylmethane diisocyanate, carbodiimide-modified diphenylmethane diisocyanate, crude diphenylmethane diisocyanate, phenylene diisocyanate, tolylene diisocyanate or naphthalene diisocyanate, aliphatic polyisocyanates or polyisocyanates having a cyclic structure such as hexamethylene diisocyanate, lysine diisocyanate, cyclohexane diisocyanate, isophorone diisocyanate, dicyclohexylmethane diisocyanate, xylylene diisocyanate or tetramethylxylylene diisocyanate. Among these, 4,4'-diphenylmethane diisocyanate is used preferably due to its low vapor pressure when melted.

The reaction between the polyol (A) and the polyisocyanate (B) is preferably carried out by, for example, respectively and separately, or as a mixture, dropping the polyol (A) from which moisture has been removed, namely the polyester polyol (a-1), the polyester polyol (a-2) that is a solid at normal temperatures, the polyoxyethylene glycol (a-3), and, as necessary, other polyols, into the polyisocyanate (B) in a reaction vessel, followed by heating and allowing to react until the hydroxyl groups possessed by the polyol (A) are substantially no longer present. As a result, a urethane prepolymer containing isocyanate groups can be produced. In addition, an isocyanate group-containing urethane prepolymer can also be produced by a so-called continuous extrusion reaction method by placing the preheated polyol (A) and polyisocyanate (B) into an extruder at a prescribed ratio.

Although the reaction between the polyol (A) and the polyisocyanate (B) can normally be carried out in the absence of solvent, it may also be carried out in an organic solvent. In the case of carrying out the reaction in an organic solvent, although an organic solvent such as ethyl acetate, n-butyl acetate, methyl ethyl ketone or toluene can be used provided it does not hinder the reaction, it is necessary to remove the organic solvent by a method such as heating under reduced pressure either during or following completion of the reaction.

The polyol (A) and the polyisocyanate (B) are preferably used at an equivalent ratio of isocyanate groups possessed by the polyisocyanate (B) to hydroxyl groups possessed by the polyol (A) (referred to as the equivalent ratio of isocyanate groups/hydroxyl groups) within the range of 1.1 to 5.0 and more preferably within the range of 1.5 to 3.0. Preparation of the polyol (A) and the polyisocyanate (B) at an equivalent ratio within these ranges makes it possible to improve coatability since the melt viscosity at 125° C. is 10000 mPa·s or less, and enable the formation of a moisture-permeable film having superior mechanical strength.

A urethanization catalyst can be used as necessary when reacting the polyol (A) and the polyisocyanate (B). The urethanization catalyst can be suitably added at an arbitrary stage of the reaction.

Examples of the urethanization catalyst that can be used include nitrogen-containing compounds such as triethylamine, triethylenediamine and N-methylmorpholine, metal salts such as potassium acetate, zinc stearate and tin octylate, and organometallic compounds such as dibutyltin dilaurate.

The following provides an explanation of the second step used when producing the reactive urethane prepolymer (D).

The second step is a step for reacting the isocyanate group-containing urethane prepolymer obtained in the first step with a hydroxyl group-containing (meth)acrylate. More specifically, 10 to 90% of the equivalent of isocyanate groups possessed by the isocyanate group-containing urethane prepolymer are mixed and reacted with the hydroxyl group-containing (meth)acrylate (C) while heating to obtain the reactive urethane prepolymer (D) into which has been introduced polymerizable unsaturated double bonds.

The reaction between the isocyanate group-containing urethane prepolymer and the hydroxyl group-containing (meth)acrylate is preferably carried out on 10 to 90%, and more preferably 10 to 60%, of the equivalent of isocyanate groups possessed by the urethane prepolymer, and carrying out the reaction on 10 to 30% of the equivalent of isocyanate groups possessed by the urethane prepolymer is particularly preferable in terms of obtaining a moisture-permeable film having superior flexibility and mechanical strength as well as superior surface quality.

As a result of reacting between the isocyanate groups and hydroxyl group-containing (meth)acrylate within the aforementioned ranges, an amount of polymerizable unsaturated double bonds that allows the curing rate of the polyurethane hot melt resin composition to be improved to a desired level can be introduced into the reactive urethane prepolymer (D). Furthermore, the equivalent of isocyanate groups in the reactive urethane prepolymer (D) can be determined by, for example, reacting the isocyanate groups with dibutylamine by mixing the reactive urethane prepolymer (D) with an excess of dibutylamine, and then back-titrating the amount of dibutylamine remaining with hydrochloric acid.

More specifically, the reaction between the isocyanate group-containing urethane prepolymer and the hydroxyl group-containing (meth)acrylate is preferably carried out by dropping in the hydroxyl group-containing (meth)acrylate and, as necessary, 10 to 300 ppm of a tin-based catalyst such as dibutyltin dilaurate, into a reaction vessel containing the isocyanate group-containing urethane prepolymer controlled to a temperature of 80 to 120° C.

The following provides an explanation of the (meth)acrylate (E) used in the present invention.

The (meth)acrylate (E) is an essential component of the reactive polyurethane hot melt resin composition used in the present invention. Examples of the (meth)acrylate (E) that can be used include monofunctional (meth)acrylates having a single polymerizable double bond in a molecule thereof and polyfunctional (meth)acrylates having two or more polymerizable double bonds in a molecule thereof. A monofunctional (meth)acrylate is used particularly preferable for the (meth)acrylate (E) in cases of obtaining a moisture-permeable film having a superior flexible pliable texture. On the other hand, a polyfunctional (meth)acrylate is preferably used for the (meth)acrylate (E) in cases of obtaining a moisture-permeable film having superior durability and resistance to roughening.

Examples of the aforementioned monofunctional (meth)acrylates that can be used include isobutyl(meth)acrylate, t-butyl(meth)acrylate, isooctyl(meth)acrylate, isononyl(meth)acrylate, lauryl(meth)acrylate, isobornyl(meth)acrylate, stearyl(meth)acrylate, behenyl(meth)acrylate, cyclohexyl(meth)acrylate, phenoxyethyl(meth)acrylate, 2-methoxy(meth)acrylate, methoxytriethylene glycol(meth)acrylate, tetrahydrofurfuryl(meth)acrylate, benzyl(meth)acrylate and ethyl carbitol(meth)acrylate. The use of isooctyl(meth)acrylate, isononyl(meth)acrylate, lauryl(meth)acrylate, stearyl(meth)acrylate or behenyl(meth)acrylate composed of long-chain aliphatic acids in particular allows the obtaining of a moisture-permeable film having a superior flexible pliable texture.

In addition, the aforementioned polyfunctional (meth)acrylates are able to further improve the curing rate and post-curing crosslinking density of the reactive polyurethane hot melt resin composition as a result of contributing to the formation of a crosslinked structure due to the formation of double bonds within molecules thereof, thereby imparting even more superior durability and roughening resistance to the moisture-permeable film. Although the aforementioned polyfunctional (meth)acrylates have two or more polymerizable double bonds, they preferably have 2 to 4 of such bonds.

Examples of the aforementioned polyfunctional (meth)acrylates that can be used include one type or two or more types selected from (meth)acrylates such as polyethylene glycol di(meth)acrylate, tripropylene glycol di(meth)acrylate, neopentyl glycol hydroxypivalate di(meth)acrylate, modified (meth)acrylates in which bisphenol A has been modified with ethylene oxide or propylene oxide, ditrimethylolpropane tetra(meth)acrylate, neopentyl glycol di(meth) acrylate, 1,6-hexanediol di(meth)acrylate, trimethylolpropane tri(meth)acrylate, pentaerythritol tri(meth)acrylate or pentaerythritol tetra(meth)acrylate, and (meth)acrylate esters of sugar alcohols such as sorbitol. In addition, addition products obtained by adding alkylene oxides, aliphatic esters or caprolactones and the like to these (meth)acrylates can also be used. Examples of these alkylene oxide addition products that can be used include ethylene oxide addition products and propylene oxide addition products.

From the viewpoint of imparting superior curability by irradiation with ultraviolet light, preferable examples of the aforementioned polyfunctional (meth)acrylates that can be used include one or more types selected from the group consisting of polyethylene glycol diacrylate, trimethylolpropane triacrylate, pentaerythritol tetraacrylate and ethylene oxide and propylene oxide addition products thereof.

The use of a combination of the aforementioned monofunctional (meth)acrylates and polyfunctional (meth)acrylates for the aforementioned (meth)acrylate (E) is preferable in terms of realizing both a superior flexible pliable texture, durability and resistance to roughening.

The (meth)acrylate (E) is preferably used within the range of 5 to 50 parts by weight, and more preferably within the range of 10 to 30 parts by weight, based on 100 parts by weight of the reactive urethane prepolymer (D). The use of the (meth)acrylate (E) within the above ranges makes it possible to favorable inhibit roughening without impairing the flexible pliable texture of the moisture-permeable film. Furthermore, in the case of using a combination of a monofunctional (meth)acrylate and polyfunctional (meth)acrylate as previously described, the monofunctional (meth)acrylate is preferably used within the range of 15 to 70% by weight based on the total weight of the (meth)acrylate (E).

Next, an explanation is provided of the photopolymerization initiator (F) used in the present invention.

The photopolymerization initiator (F) acts as an initiator of a crosslinking reaction of polymerizable unsaturated double bonds possessed by the reactive urethane prepolymer (D).

The content of the photopolymerization initiator (F) is preferably within the range of 0.5 to 5.0 parts by weight, and more preferably within the range of 1.0 to 3.0 parts by weight, based on 100 parts by weight of the reactive urethane prepolymer (D). The use of the photopolymerization initiator (F) within the above ranges makes it possible to suitably adjust the curing rate of the reactive polyurethane hot melt resin composition, thereby enabling the crosslinking reaction to proceed uniformly while even more favorably inhibiting roughening.

Examples of the photopolymerization initiator (F) that can be used preferably include conventionally known photopolymerization initiators such as benzophenone and other alkyl phenone-based initiators, camphor quinone-based initiators, acylphosphine oxide-based initiators and titanocene-based initiators.

Examples of commercially available photopolymerization initiators that can be used include Quantacure (International Bio-Synthetics), Kayacure MBP (Nippon Kayaku), Esacure BO (Fratelli Lamberti), Trigonal 14 (Akzo), Irgacure®, Darocure®, Speedcure® (Ciba-Geigy), and a mixture of Darocure® 1173 and Fi-4 (Eastman). The use of Irgacure® 651 is particularly preferable in terms of being able to impart superior curability when irradiated with ultraviolet light.

In addition to each of the components previously described, the reactive polyurethane hot melt resin composition used in the present invention can also combine the use of an additive such as a tackifier, plasticizer, heat stabilizer, light stabilizer, filler, urethanization catalyst, silane coupling agent, thixotropic agent, wax, fluorescent whitening agent or foaming agent, or a thermoplastic resin, thermosetting resin, pigment, electrical conductivity-imparting agent, antistatic agent, permeability improver, water repellent, oil repellent, hollow foam, crystallization water-containing compound, flame retardant, water absorber, moisture absorber, deodorizer, foam control agent, antifoaming agent, antimold agent, preservative, antialgal agent, pigment dispersant, inert gas, anti-blocking agent or anti-hydrolysis agent, as necessary.

Examples of tackifiers that can be used include rosin-based resins, rosin ester-based resins, hydrogenated rosin ester-based resins, terpene-based resin, terpene phenol-based resin, hydrogenated terpene-based resin and petroleum resins such as $C_5$-based aliphatic resins, $C_9$-based aromatic resins and $C_5$- and $C_9$-based copolymer resins.

Examples of plasticizers that can be used include dibutyl phthalate, dioctyl phthalate, dicyclohexyl phthalate, diisooctyl phthalate, diisodecyl phthalate, dibenzyl phthalate, butylbenzyl phthalate, trioctyl phosphate, epoxy-based plasticizers, toluene-sulfoamides, chloroparaffin, adipic acid esters and castor oil.

Examples of heat stabilizers that can be used include hindered phenol-based compounds, benzotriazole-based compounds and hindered amine-based compounds.

Examples of fillers that can be used include silicic acid derivatives, calcium carbonate, aluminum hydroxide, barium sulfate, kaolin, talc, carbon black, alumina, magnesium oxide, inorganic or organic balloon fillers, tourmaline, activated charcoal, metal powder and clay.

The reactive polyurethane hot melt resin composition used in the present invention can be produced by mixing the reactive urethane prepolymer (D), the (meth)acrylate (E) and the photopolymerization initiator (F) heated to, for example, 100° C. More specifically, the isocyanate group-containing urethane prepolymer and the hydroxyl group-containing (meth)acrylate (C) are preferably allowed to react followed by mixing with the (meth)acrylate (E) and the photopolymerization initiator (F).

Next, an explanation is provided of the moisture-permeable film production method of the present invention.

The following describes an example of the moisture-permeable film production method of the present invention.

A reacted polyurethane hot melt resin composition heated and melted within the range of, for example, preferably 50 to 130° C., and more preferably 80 to 120° C., is uniformly applied onto a releasable film using a coating device followed by solidifying the reactive polyurethane hot melt resin composition by cooling at normal temperatures. Next, polymerizable unsaturated double bonds possessed by the reactive urethane prepolymer (D) are made to undergo a radical reaction by irradiating the coated surface with ultraviolet light and the like to further accelerate curing.

Subsequently, a laminate composed of the releasable film and the reactive polyurethane hot melt resin composition is wound onto a roller, for example, followed by aging for a fixed period of time to further accelerate moisture curing of the reactive polyurethane hot melt resin composition. After aging, the releasable film is separated and removed to obtain the moisture-permeable film of the present invention.

Examples of the releasable film that can be used include releasable paper, release treated cloth (namely, cloth subjected to release treatment), water repellency treated cloth, olefin sheets or olefin films such as those composed of polyethylene resin or polypropylene resin, sheets or films composed of fluorocarbon resins, plastic films provided with releasable paper, and polyurethane resin films provided with releasable paper.

In addition, preferable examples of devices for coating the molten reactive polyurethane hot melt resin composition onto a releasable film include a roll coater, comma coater, spray coater, T-die coater (including devices in which a gear pump is introduced into the die head), knife coater and bar coater, while methods using a roll coater are particularly preferable in terms of being able to more accurately control film thickness.

In addition, the radiation dosage of the ultraviolet light and the like is preferably 50 to 5000 mJ/cm$^2$, and more preferably 100 to 3000 mJ/cm$^2$, from the viewpoint of adequately accelerating curing.

A known lamp such as a xenon lamp, xenon-mercury lamp, metal halide lamp, high-pressure mercury lamp or low-pressure mercury lamp can be used when radiating the ultraviolet light. Furthermore, the aforementioned ultraviolet radiation dosage is based on the value measured at a wavelength band of 300 to 390 nm using the UVR-N1 UV Checker (Japan Storage Battery).

In addition, radiating ultraviolet light and the like immediately before winding the moisture-permeable film onto a roller and the like is preferable from the viewpoint of preventing decreases in surface quality. In the case of coating the reactive polyurethane hot melt resin composition onto the surface of the releasable film, additionally placing a sheet permeable to ultraviolet light on the coated surface, and then winding the resulting laminate onto a roller and the like, ultraviolet light may be radiated from above the sheet after unwinding the laminate.

In addition, a photocuring reaction and moisture curing reaction may be allowed to proceed simultaneously, or one or the other may be allowed to proceed first followed by progression of the other curing reaction.

In addition, typical aging conditions when producing the moisture-permeable film consist of an environmental temperature of 20 to 40° C., relative humidity of 50 to 80% and aging period of 1 to 5 days, and more typically 3 days. The aforementioned aging is typically carried out with the moisture-permeable film wound onto a roller and the like as previously described. The use of such aging conditions serves to complete the reaction between isocyanate groups remaining in the reactive polyurethane hot melt resin composition and moisture (namely, water), thereby making it possible to obtain a moisture-permeable film having superior durability in which surface roughening is inhibited. In addition, radical polymerization reaction may also be used in combination with the aforementioned moisture curing reaction and photopolymerization reaction during aging, and in such cases, a heated polymerization initiator and the like is preferably contained in the reactive polyurethane hot melt resin composition in advance.

In conventionally known methods for forming a moisture-permeable film by moisture curing a polyurethane hot melt resin composition, there are many cases in which curing of the polyurethane hot melt resin composition is not completed even after carrying out aging as described above, or cases in which tackiness remains on the surface thereof if the composition is susceptible to the occurrence of tackiness even after having been completely cured. In the present invention, on the other hand, since curing of the polyurethane hot melt resin composition proceeds adequately due to a rapid crosslinking reaction attributable to the contribution by double bonds, tackiness is significantly reduced, thereby resulting in the formation of a moisture-permeable film in which roughening is inhibited.

The following provides an explanation of the laminate of the present invention.

The laminate of the present invention has various adhesives intermittently coated onto at least one surface of the aforementioned moisture-permeable film, and has a moisture-permeable base material adhered to the resulting coated surface.

Examples of moisture-permeable base materials that can be used to produce the laminate of the present invention include moisture-permeable fiber base materials such as non-woven fabric, woven fabric or knitted fabric.

Examples of methods for intermittently coating the adhesive include methods involving coating into the form of dots and methods involving coating in a mesh pattern in order not to impair the flexible pliable texture and moisture permeability of the resulting laminate.

A moisture-curable polyurethane hot melt adhesive is preferably used for the adhesive used to adhere the moisture-permeable film and the moisture-permeable base material. Although a commercially available reactive hot melt adhesive can be used for the aforementioned moisture-curable polyurethane hot melt adhesive, an adhesive which itself has moisture permeability is used more preferably in order to further improve moisture permeability.

Examples of the aforementioned adhesives having moisture permeability include moisture-permeable polyurethane hot melt adhesives having for a main component thereof a urethane prepolymer that is the reaction product of a polyisocyanate and a polyol, the polyol combining a polyester polyol (X-1), obtained by reacting a polyol in which an alkylene oxide is added to bisphenol A with an aliphatic polycarboxylic acid and an aromatic polycarboxylic acid, a crystalline polyester polyol (X-2), and polyoxyethylene glycol (X-3) having a number average molecular weight of 2000 to 25000.

The number average molecular weight of the urethane prepolymer contained in the aforementioned moisture-curable polyurethane hot melt adhesive having moisture permeability is preferably within the range of 500 to 30000 and more preferably within the range of 1000 to 10000. If the number average molecular weight of the urethane prepolymer is within the above ranges, a moisture-curable polyurethane hot melt adhesive can be obtained that has superior fluidity and processability when melted. In addition, the softening point thereof is preferably within the range of 40 to 120° C. Furthermore, softening point as referred to in the present invention refers to the temperature at which convective flow begins and cohesive force is lost when the temperature of the urethane prepolymer is raised in a stepwise manner, and more specifically, refers to the value as determined in accordance with the ring and ball method (JIS K-6301).

The urethane prepolymer used in the aforementioned adhesive can be produced using a known commonly used method. For example, the urethane prepolymer can be produced by respectively and separately, or as a mixture, dropping the polyol from which moisture has been removed, containing the polyester polyol (X-1), the crystalline polyester polyol (X-2) and the polyoxyethylene glycol (X-3), into the polyisocyanate in a reaction vessel, followed by heating and allowing to react until hydroxyl groups possessed by the polyol are substantially no longer present.

A polyester polyol that is the same as the aforementioned polyester polyol (a-1) is preferably used for the polyester polyol (X-1). In addition, although various types of crystalline polyester polyols can be used for the crystalline polyester polyol (X-2), those that are the same as the aforementioned polyester polyol (a-2), which is a solid at normal temperatures, are used preferably.

In addition, polyoxyethylene glycols having a number average molecular weight of 2000 to 25000 are mainly used preferably for the polyoxyethylene glycol (X-3).

The polyester polyol (X-1) is preferably used at 5 to 30 parts by weight, and more preferably at 5 to 20 parts by weight, based on a value of 100 parts by weight for the total amount of the polyol that composes the urethane prepolymer. In addition, the polyester polyol (X-2) is preferably used a 5 to 30 parts by weight, and preferably at 5 to 20 parts by weight, based on a value of 100 parts by weight for the total amount of the polyol that composes the urethane prepolymer. In addition, the polyoxyethylene glycol (X-3) is preferably used at 30 to 85 parts by weight, and more preferably 40 to 70 parts by weight, based on a value of 100 parts by weight for the total amount of the polyol (A) that composes the urethane prepolymer. As a result, an adhesive can be obtained that is able to demonstrate adequate levels of moisture permeability and ordinary state adhesive strength for practical use.

The same polyisocyanates as those indicated in examples of polyisocyanates able to be used to produce the aforementioned moisture-permeable film can be produced for use as the polyisocyanate used to produce the aforementioned adhesive.

The laminate of the present invention can be produced by, for example, coating the moisture-curable polyurethane hot melt adhesive in a heated molten state onto the surface of a moisture-permeable film or moisture-permeable base material, followed by placing a moisture-permeable base material or moisture-permeable film on the coated surface and adhering thereto.

Examples of methods for coating the adhesive on the moisture-permeable film or moisture-permeable base material include gravure transfer coating employing an engravedroll, screen coating, T-die coating, die coating using a coater provided with a gear pump, and fiber coating.

A laminate obtained according to a method as described above can be used in, for example, in sportswear, raincoats, gloves, shoes, fire fighting clothes, military uniforms, bandage films, disposable diapers, wall materials and roof materials.

EXAMPLES

The following provides a more detailed explanation of the present invention using examples and comparative examples.

[Measurement of Number Average Molecular Weight (Mn) of Reactive Urethane Prepolymer]

Number average molecular weight (Mn) was calculated on the basis of polystyrene after measuring by gel permeation chromatography (GPC).

[Measurement of Melt Viscosity of Reactive Urethane Prepolymer]

Melt viscosity (mPa·s) of the reactive urethane prepolymer was measured using a cone-plate viscometer (ICI, measuring temperature: 125° C.).

[Measurement of Glass Transition Temperature (Tg) of Reactive Urethane Prepolymer]

Glass transition temperature (Tg) of the reactive urethane prepolymer was measured based on the peak temperature (unit: ° C.) of loss tangent (tan δ) of a film, which was obtained by coating the reactive urethane prepolymer to a thickness of 30 μm and aging for 5 days at an environmental temperature of 23° C. and relative humidity of 65%, using a dynamic viscoelasticity measuring system (Rheometric Scientific, frequency: 1 Hz, heating rate: 5° C./min)

Synthesis Example 1

Production of Reactive Urethane Prepolymer (D'-1)

15 parts by weight of a polyester polyol (a-1-1) having a number average molecular weight of 2000, which was obtained by reacting a polyether polyol, obtained by adding 6 moles of propylene oxide to bisphenol A, sebacic acid and isophthalic acid, 20 parts by weight of a polyester polyol (a-2-1) having a number average molecular weight of 2000, which was obtained by reacting neopentyl glycol, 1,6-hexanediol and adipic acid, and 65 parts by weight of polyoxyethylene glycol (a-3-1) having a number average molecular weight of 4000, were heated under reduced pressure at 120° C. in a 1 liter four-mouth flask followed by mixing and dehydrating until the moisture content reached 0.05% by weight.

Next, after adding 18 parts by weight of 4,4'-diphenylmethane diisocyanate to the aforementioned mixture cooled to 70° C., an isocyanate group-containing reactive urethane prepolymer (D'-1) was obtained by reacting for 3 hours at 90° C. until the isocyanate group content became constant. The melt viscosity of the reactive urethane prepolymer (D'-1) as determined with a cone-plate viscometer at 125° C. was 1100 mPa·s, the isocyanate group content was 2.72% by weight, and the glass transition temperature (Tg) was −19.3° C. In addition, the equivalent ratio (NCO/OH) of the isocyanate groups possessed by the 4,4'-diphenylmethane diisocyanate to the hydroxyl groups possessed by the polyols was 2.13.

Synthesis Example 2

Production of Reactive Urethane Prepolymer (D-1)

A reactive urethane prepolymer (D-1) was obtained by adding 1.02 parts by weight of 2-hydroxyethylacrylate and 0.01 parts by weight of tin octylate to 100 parts by weight of the aforementioned reactive urethane prepolymer (D'-1) heated to 110° C. and allowing to react. The percentage [(HEA/NCO)×100)] of the equivalent of isocyanate groups that reacted with hydroxyl groups of the 2-hydroxyethylacrylate to the total equivalent of isocyanate groups possessed by the reactive urethane prepolymer (D-1) was 15%.

Furthermore, the percentage [(HEA/NCO)×100] of the reactive urethane prepolymer (D-1) determined by adding an excess of dibutylamine to the reactive urethane prepolymer (D-1), allowing the dibutylamine to react with isocyanate groups remaining in the reactive urethane prepolymer (D-1), and determining the amount of dibutylamine remaining by reverse titration using hydrochloric acid to determine the equivalent of isocyanate groups possessed by the reactive urethane prepolymer (D-1) followed by calculating the aforementioned percentage based on that equivalent. The values for [(HEA/NCO)×100] of the following reactive urethane prepolymers (D-2) to (D-6) and (D'-2) to (D'-6) were calculated in the same manner.

Synthesis Examples 3 to 11

Reactive urethane prepolymers (D-2) to (D-5) and (D'-2) to (D'-6) were respectively produced using the same method as described in Synthesis Examples 1 and 2 with the exception of changing the compositions of the reactive urethane prepolymer to those described in Tables 1 and 2, respectively.

Furthermore, the number average molecular weight of the polyoxypropylene glycol (a-3-2) in Table 2 was 2000.

TABLE 1

|  | Syn. Ex. 1 | Syn. Ex. 2 | Syn. Ex. 3 | Syn. Ex. 4 | Syn. Ex. 5 | Syn. Ex. 6 |
|---|---|---|---|---|---|---|
| Reactive urethane prepolymer no. | (D'-1) | (D-1) | (D-2) | (D-3) | (D-4) | (D-5) |
| Polyol (A) | | | | | | |
| Polyester polyol (a-1-1) (parts by weight) | 15 | 15 | 15 | 15 | 15 | 15 |
| Polyester polyol (a-2-1) (parts by weight) | 20 | 20 | 20 | 20 | 20 | 20 |
| Polyoxyethylene glycol (a-3-1) (parts by weight) | 65 | 65 | 65 | 65 | 65 | 65 |
| Polyisocyanate (B) | | | | | | |
| 4,4'-diphenylmethane diisocyanate (parts by weight) | 18 | 18 | 18 | 18 | 18 | 18 |
| Xylylene diisocyanate (parts by weight) | — | — | — | — | — | — |
| [(HEA/NCO) × 100] (%) | — | 15 | 25 | 50 | 75 | 90 |

TABLE 2

|  | Syn. Ex. 7 | Syn. Ex. 8 | Syn. Ex. 9 | Syn. Ex. 10 | Syn. Ex. 11 |
|---|---|---|---|---|---|
| Reactive urethane prepolymer no. | (D'-2) | (D'-3) | (D'-4) | (D'-5) | (D'-6) |
| Polyol (A) | | | | | |
| Polyester polyol (a-1-1) (parts by weight) | 15 | 15 | — | 35 | 15 |
| Polyester polyol (a-2-1) (parts by weight) | 20 | 20 | — | — | 20 |
| Polyoxyethylene glycol (a-3-1) (parts by weight) | 65 | 65 | 100 | 65 | — |
| Polyoxypropylene glycol (a-3-2) (parts by weight) | — | — | — | — | 65 |
| Polyisocyanate (B) | | | | | |
| 4,4'-diphenylmethane diisocyanate (parts by weight) | 18 | 18 | 15.5 | 18 | 21 |
| Xylylene diisocyanate (parts by weight) | — | — | — | — | — |
| [(HEA/NCO) × 100] (%) | 5 | 100 | 50 | 50 | 50 |

Example 1

Moisture-Permeable Film

A reactive polyurethane hot melt resin composition was produced by mixing trimethyloipropane triacrylate and photopolymerization initiator in the form of Irgacure 651 (Ciba Specialty Chemicals) with a molten reactive urethane prepolymer (D-1) at 100° C.

Next, the molten reactive polyurethane hot melt resin composition at 120° C. was coated to a thickness of 30 μm onto releasable paper (EK-100, Lintec) using a knife coater heated to 120° C.

Next, the surface of the coated product was irradiated with ultraviolet light by passing through a conveyor type ultraviolet radiation device (CSOT-40, Japan Storage Battery, using a high-pressure mercury lamp, intensity: 120 W/cm, conveyor speed: 10 m/min) set so that the ultraviolet radiation dosage was 145 mJ/cm$^2$ per pass through the device, and after winding the coated product onto a roller, it was allowed to stand for 3 days in an environment at a temperature of 23° C. and relative humidity of 65% to accelerate the moisture curing reaction. After allowing to stand, the formed film was separated from the releasable paper to obtain a moisture-permeable film (1).

Furthermore, the ultraviolet radiation dosage described above refers to the value measured at a wavelength band of 300 to 390 nm using the UVR-N1 UV Checker (Japan Storage Battery).

Next, a laminate was produced according to the method described below using the resulting moisture-permeable film (1). More specifically, a molten moisture-curable polyurethane hot melt adhesive at 120° C. (moisture-curable polyurethane hot melt adhesive composed of the urethane prepolymer (D'-1) produced in Synthesis Example 1) was intermittently coated at 20 g/m$^2$ on the moisture-permeable film (1) using a gravure roll having a lattice pattern of 40 lines/inch and heated to 120° C., followed by laminating a fibrous base material in the form of 40 denier Nylon taffeta onto the coated surface and allowing to stand for 3 days in an environment at a temperature of 23° C. and relative humidity of 65% to obtain a laminate (1).

Examples 2 to 10 and Comparative Examples 1 to 7

Moisture-permeable films (II) to (XIV) and laminates (II) to (XIV) were produced using the same method as Example 1 with the exception of changing the compositions of the reactive urethane prepolymer to those described in the following Tables 3 and 4.

[Measurement of Flexibility (Pliable Texture) and Strength of Moisture-Permeable Film]

The tensile property of test films, obtained by cutting out the moisture-permeable film to a size measuring 5 mm wide×7 cm long×30 μm thick, were evaluated using a Tensilon Tester (SHIMADZU CORPORATION, head speed=300 mm/min) in compliance with JIS K-7311. The flexibility of the test films were evaluated based on the value of the 100% modulus of the tensile property. Films in which the value of the 100% modulus was 4.0 MPa or less were evaluated as having an adequate level of flexibility (pliable texture) for practical use, and films having a value of 2.0 MPa or less were evaluated as having particularly preferable flexibility. In addition, strength of the moisture-permeable films was evaluated as being favorable if the breaking point stress was roughly 20 MPa or more and the breaking point elongation was 300% or more, and films having a breaking point stress of 22 MPa or more and breaking point elongation of 750% or more were evaluated as being particularly favorable.

[Measurement of Moisture Permeability of Moisture-Permeable Films]

Moisture permeability of the adequately cured moisture-permeable films was measured in compliance with the moisture permeability test of JIS L-1099 (Method A-1: Potassium Chloride Method). Moisture-permeable films having moisture permeability of 5000 g/m$^2$/24 hr or more was evaluated as having adequate moisture permeability for practical use.

[Evaluation of Roughening (Surface Tackiness) of Moisture-Permeable Films]

Molten reactive polyurethane hot melt resin compositions at 120° C. were coated onto releasable paper (EK-100, Lintec) to a film thickness of 30 μm using a knife coater heated to 120° C.

Next, the surface of the coated product was irradiated with ultraviolet light by passing through a conveyor type ultraviolet radiation device (CSOT-40, Japan Storage Battery, using a high-pressure mercury lamp, intensity: 120 W/cm, conveyor speed: 10 m/min) set so that the ultraviolet radiation dosage was 145 mJ/cm$^2$ per pass through the device, followed immediately by laminating the back side of the releasable paper (namely, the side not having releasability) onto the surface of moisture-permeable film obtained as a result of irradiation with the ultraviolet light, and allowing to stand for 24 hours under a load of 1 kg.

After allowing to stand, the interface between the moisture-permeable film and the back side of the releasable paper was separated, and roughening of the surface of the moisture-permeable film was evaluated based on the criteria indicated below.

○: No tackiness or roughening on surface of moisture-permeable film, and moisture-permeable film and back side of releasable paper able to be separated easily Δ: Slight tackiness and roughening observed on surface of moisture-permeable film, but surface of moisture-permeable film and back side of releasable paper able to be separated easily X: Moisture-permeable film and back side of releasable paper unable to be separated

[Evaluation of Waterproofing Property of Moisture-Permeable Films]

The waterproofing property of the moisture-permeable films was evaluated based on degree of water swelling. More specifically, a moisture-permeable film cut to a size measuring 10 cm long by 10 cm wide was immersed in water for 24 hours followed by measuring the dimensions of the moisture-permeable film. The moisture-permeable films were evaluated as having superior waterproofing property if the change in the dimensions of length and width of the moisture-permeable film following immersion in comparison with the dimensions before immersing was within about 20%, while those in which the change exceeded 20% were evaluated as high poor waterproofing property as a result of being susceptible to decreases in film strength and the occurrence of peeling and separation during laundering due to a large degree of moisture-induced swelling. Furthermore, the evaluation of "16*16" in Table 3 indicates that the dimension of length of the film following the immersion was 16% larger than the dimension before immersing, and that the dimension of width was similarly 16% larger.

[Measurement of Laminate Flexibility (Pliable Texture)]

The pliable texture of the laminates was evaluated to one of five levels by bending by hand. An evaluation of 3 or lower was considered to be preferable for practical use.

1: Feeling of integrity between moisture-permeable film and fibrous base material and extremely soft 2: Not much feeling of integrity between moisture-permeable film and fibrous base material, but having superior flexibility 3: Favorable flexibility 4: Some hardness felt when bending and some degree of crackling sound and feel 5: Certain amount of force required when bending and crackling sound heard during bending

[Measurement of Laminate Moisture Permeability]

The moisture permeability of the adequately cured laminates was measured in compliance with the moisture permeability test of JIS L-1099 (Method A-1: Potassium Chloride Method). Laminates having moisture permeability of 6000 g/m$^2$/24 hr or more were evaluated as having adequate moisture permeability for practical use.

TABLE 3

|  | Ex. 1 | Ex. 2 | Ex. 3 | Ex. 4 | Ex. 5 | Ex. 6 |
| --- | --- | --- | --- | --- | --- | --- |
| Type of reactive urethane prepolymer | (D-1) | (D-2) | (D-3) | (D-4) | (D-5) | (D-3) |
| Amount used (parts by weight) | 100 | 100 | 100 | 100 | 100 | 100 |
| Trimethylolpropane triacrylate (parts by weight) | 10 | 10 | 10 | 10 | 10 | — |
| A-1000 (parts by weight) | — | — | — | — | — | 10 |
| Irgacure 651 (parts by weight) | 2 | 2 | 2 | 2 | 2 | 2 |
| Property of Moisture-Permeable Films |  |  |  |  |  |  |
| Flexibility (100% modulus (MPa)) | 1.7 | 2.0 | 3.0 | 3.6 | 3.8 | 2.3 |
| Strength (breaking point stress (MPa)) | 22.5 | 22.0 | 21.0 | 21.0 | 20.0 | 25.0 |
| Strength (breaking point elongation (MPa)) | 860 | 800 | 780 | 680 | 500 | 810 |
| Moisture permeability (Method A-1: g/m$^2$/24 hr) | 7500 | 7400 | 7300 | 7350 | 7200 | 7600 |
| Roughening before UV irradiation | X | X | X | X | X | X |
| Roughening after UV irradiation | ○ | ○ | ○ | ○ | ○ | ○ |
| Waterproofing property (swelling (%): length*width) | 16*16 | 15*15 | 15*15 | 15*15 | 14*14 | 15*15 |
| Property of Laminates |  |  |  |  |  |  |
| Flexibility (1: soft to 5: hard) | 1 | 1 | 1 | 1 | 2 | 1 |
| Moisture permeability (Method A-1: g/m$^2$/24 hr) | 7400 | 7300 | 7100 | 7150 | 7000 | 7800 |

The following provides an explanation of the abbreviation used in Table 3.

A-1000: Polyethylene glycol diacrylate having a number average molecular weight of 1000

TABLE 4

|  | Ex. 7 | Ex. 8 | Ex. 9 | Ex. 10 |
|---|---|---|---|---|
| Type of reactive urethane prepolymer | (D-1) | (D-2) | (D-1) | (D-2) |
| Amount used (parts by weight) | 100 | 100 | 100 | 100 |
| Trimethylolpropane triacrylate (parts by weight) | — | — | 2.5 | 2.5 |
| Stearyl acrylate (parts by weight) | 10 | 10 | 10 | 10 |
| Irgacure 651 (parts by weight) | 2 | 2 | 2 | 2 |
| Property of Moisture-Permeable Films | | | | |
| Flexibility (100% modulus (MPa)) | 1.5 | 1.8 | 1.7 | 2.0 |
| Strength (breaking point stress (MPa)) | 23.0 | 25.0 | 26.0 | 30.0 |
| Strength (breaking point elongation (MPa)) | 850 | 780 | 800 | 700 |
| Moisture permeability (Method A-1: g/m$^2$/24 hr) | 7200 | 7100 | 7000 | 6800 |
| Roughening before UV irradiation | Δ | Δ | Δ | Δ |
| Roughening after UV irradiation | ○ | ○ | ○ | ○ |
| Waterproofing property (swelling (%): length*width) | 15*15 | 14*14 | 14*14 | 13*13 |
| Property of Laminates | | | | |
| Flexibility (1: soft to 5: hard) | 1 | 1 | 1 | 1 |
| Moisture permeability (Method A-1: g/m$^2$/24 hr) | 7100 | 7000 | 6900 | 6700 |

TABLE 5

|  | Comp. Ex. 1 | Comp. Ex. 2 | Comp. Ex. 4 | Comp. Ex. 5 | Comp. Ex. 6 | Comp. Ex. 7 |
|---|---|---|---|---|---|---|
| Type of reactive urethane prepolymer | (D'-1) | (D'-2) | (D'-3) | (D'-4) | (D'-5) | (D'-6) |
| Amount used (parts by weight) | 100 | 100 | 100 | 100 | 100 | 100 |
| Trimethylolpropane triacrylate (parts by weight) | — | 10 | 10 | 10 | 10 | 10 |
| Irgacure 651 (parts by weight) | — | 2 | 2 | 2 | 2 | 2 |
| Property of Moisture-Permeable Films | | | | | | |
| Flexibility (100% modulus (MPa)) | 1.5 | 1.6 | 12.0 | 10.0 | 2.0 | 3.2 |
| Strength (breaking point stress (MPa)) | 22.0 | 23.0 | 10.6 | 8.0 | 16.0 | 16.0 |
| Strength (breaking point elongation (MPa)) | 950 | 770 | 200 | 250 | 530 | 580 |
| Moisture permeability (Method A-1: g/m$^2$/24 hr) | 8000 | 6200 | 5200 | 9500 | 6000 | 150 |
| Roughening before UV irradiation | Δ | X | X | Δ | X | X |
| Roughening after UV irradiation | Δ | Δ | ○ | ○ | Δ | Δ |
| Waterproofing property (swelling (%): length*width) | 20*20 | 19*19 | 12*12 | 23*23 | 19*19 | 3*3 |
| Property of Laminates | | | | | | |
| Flexibility (1: soft to 5: hard) | 1 | 1 | 5 | 4 | 1 | 3 |
| Moisture permeability (Method A-1: g/m$^2$/24 hr) | 7800 | 6000 | 3800 | 9000 | 5800 | 120 |

The invention claimed is:

1. A moisture-permeable film obtained by curing a reactive polyurethane hot melt resin composition comprising a reactive urethane prepolymer (D), a (meth)acrylate (E) and a photopolymerization initiator (F), wherein
the reactive urethane prepolymer (D) is obtained by reacting a hydroxyl group-containing (meth)acrylate (C) with 10% to 90% of the equivalent of isocyanate groups possessed by an urethane prepolymer obtained by reacting a polyisocyanate (B) with a polyol (A);
and the polyol (A) contains a polyester polyol (a-1) which is obtained by reacting polycarboxylic acid with a polyol in which an alkylene oxide is added to bisphenol A, a polyester polyol (a-2) which is a solid at room temperature and a polyoxyethylene glycol (a-3) which has a number average molecular weight of 1000 to 25,000.

2. The moisture-permeable film according to claim 1, wherein the polyol (A) contains 5 to 30 parts by weight of the polyester polyol (a-1), 10 to 30 parts by weight of the polyester polyol (a-2), and 30 to 85 parts by weight of the polyoxyethylene glycol (a-3), based on a value of 100 parts by weight for the total amount of the polyol (A).

3. The moisture-permeable film according to claim 1, wherein the polyester polyol (a-1) is obtained by a condensation reaction of a polyether polyol, in which 4 to 8 moles of propylene oxide is added to bisphenol A, with sebacic acid and isophthalic acid.

4. The moisture-permeable film according to claim 1, wherein the polyester polyol (a-2) is obtained by reacting a polyol, containing 1,6-hexanediol and neopentyl glycol, with adipic acid.

5. The moisture-permeable film according to claim 1, wherein the (meth)acrylate (E) is one or more types of polyfunctional (meth)acrylates selected from the group consisting of polyethylene glycol diacrylate, trimethylolpropane triacrylate, pentaerythritol tetraacrylate, and ethylene oxide addition products and propylene oxide addition products thereof.

6. The moisture-permeable film according to claim 1, wherein the thickness thereof is within the range of 5 to 50 mum.

7. A production method of a moisture-permeable film, comprising
forming a molten reactive polyurethane hot melt resin composition in a heated molten state containing a reactive urethane prepolymer (D), a (meth)acrylate (E) and a photopolymerization initiator (F) into the form of a film having a thickness of 5 to 50 μ.m; and allowing a photocuring reaction and a moisture curing reaction to proceed either sequentially or simultaneously, wherein the reactive urethane prepolymer (D) is obtained by reacting a hydroxyl group-containing (meth)acrylate (C) with 10% to 90% of the equivalent of isocyanate groups possessed by an urethane prepolymer obtained by reacting a polyisocyanate (B) with a polyol (A);

and the polyol (A) contains a polyester polyol (a-1) which is obtained by reacting polycarboxylic acid with a polyol in which an alkylene oxide is added to bisphenol A, a polyester polyol (a-2) which is a solid at room temperature, and a polyoxyethylene glycol (a-3) which has a number average molecular weight of 1000 to 25,000.

8. A laminate comprising a moisture-permeable base material on a coated surface of the laminate, wherein the moisture-permeable base material is obtained by intermittently coating a molten reactive polyurethane hot melt adhesive onto one or both sides of a moisture-permeable film obtained by curing a reactive polyurethane hot melt resin composition;

the reactive polyurethane hot melt resin composition contains a reactive urethane prepolymer (D), a polyfunctional (meth)acrylate (E) and a photopolymerization initiator (F);

the reactive urethane prepolymer (D) is obtained by reacting a hydroxyl group-containing (meth)acrylate (C) with 10% to 90% of the equivalent of isocyanate groups possessed by an urethane prepolymer obtained by reacting a polyisocyanate (B) with a polyol (A);

and the polyol (A) contains a polyester polyol (a-1) which is obtained by reacting polycarboxylic acid with a polyol in which an alkylene oxide is added to bisphenol A, a polyester polyol (a-2) which is a solid at room temperature, and a polyoxyethylene glycol (a-3) which has a number average molecular weight of 1000 to 25,000.

* * * * *